United States Patent [19]
Wiss

[11] 3,826,129
[45] July 30, 1974

[54] AUTOMOTIVE VEHICULAR DYNAMOMETER

[76] Inventor: John W. Wiss, 3316 Brookdale Dr., Pittsburgh, Pa. 15241

[22] Filed: Aug. 15, 1972

[21] Appl. No.: 280,865

[52] U.S. Cl. ............................................. 73/117
[51] Int. Cl. ............................................. G01l 5/13
[58] Field of Search............. 73/117, 146, 8, 133 R, 73/134, 141 R

[56] References Cited
UNITED STATES PATENTS

| | | | |
|---|---|---|---|
| 1,513,430 | 10/1924 | Scott | 73/117 |
| 2,576,544 | 11/1951 | Smith | 73/117 X |
| 3,402,599 | 9/1968 | MacMillan | 73/117 |
| 3,704,624 | 12/1972 | Marten et al. | 73/117 |

FOREIGN PATENTS OR APPLICATIONS

| 47,492 | 7/1933 | Denmark | 73/117 |
|---|---|---|---|

Primary Examiner—Jerry W. Myracle

[57] ABSTRACT

An improved testing machine for operating an automotive vehicle under power while it is standing still. This type of operation is desired in such endeavors as service diagnosis and measurement of exhaust emissions. In this device, power is absorbed by friction between the vehicle's driving wheels and a stationary dynamometer member. Overheating of the tire is prevented by inserting a fluid such as water or air at the juncture of the tire and dynamometer, or otherwise cooling the dynamometer absorption plate. Load may be adjusted by raising or lowering the vehicle, and measured as a vehicle thrust against the dynamometer. Speed may be measured from the motion of the driving wheel. Horsepower may be calculated automatically to provide a continuous presentation of speed and horsepower to the test operator. This vehicular dynamometer possesses many of the characteristics of the traction or drawbar dynamometers, except that the vehicle remains essentially stationary.

3 Claims, 6 Drawing Figures

AUTOMOTIVE VEHICULAR DYNAMOMETER

For many years, devices called automotive vehicular dynamometers have been built and used to absorb and measure the power from an automotive vehicle while the vehicle is simulating road loads or other operation and yet is standing still. These devices have principally been used in the design and development of automotive equipment, and in its mechanical inspection and adjustment during service operations. They permit ready observation of and access to the vehicle being tested. This is particularly important when the observing or testing equipment is not portable and cannot readily accompany the vehicle during normal operation. A dynamometer is also useful in providing reproducible load conditions from one test to another. Road testing, in order to provide reproducible results, often requires the construction of expensive special roadways on professionally-operated proving grounds. This typically makes dynamometer testing quicker and less expensive than road testing. The Federal Procedure for automotive exhaust emissions testing, for example, specifies dynamometer testing. The machinery and inventions in this prior art have generally been pointed toward use by sophisticated technicians in the research & development, racing, and truck repair fields. The cost and skill requirements have been acceptable to that environment. In these prior-art dynamometers, power is generally transferred from the vehicle driving wheels to one or more rollers, which also may support the weight of the vehicle and sense its speed. The power received by the rollers is subsequently converted to heat in electrical, hydraulic, pneumatic, or friction devices. Power is customarily measured from roller torque and speed, although direct electrical or fluid measurements have been used.

With the advent of large-volume testing of automobiles for service diagnostic and exhaust-emissions purposes there is a growing need for a dynamometer that can be operated by the average service technician, and provided to him at a relatively low cost. Cheapened versions of conventional dynamometers have not been very satisfactory, since they require essentially the same laboratory-technician level of skill and careful maintenance.

The object of this invention, therefore, is to provide an automotive vehicular dynamometer that is satisfactory for service diagnostic and exhaust-emissions compliance testing, and other uses, with inherent low cost and ease of use.

I have observed that automobile tires can spin on wet or otherwise cooled pavements, providing moderate levels of propulsive thrust with apparently negligible deterioration of the tire. Tire deterioration, according to published sources, only becomes rapid when the rubber temperature becomes high, such as greater than 250F. My observations and calculations indicate that several means of cooling are adequate to prevent spinning tire temperatures from exceeding such a level. For example, fluids such as water or air can be introduced into the space between tire and pavement and provide effective cooling. Thermally-conductive pavement plates with fluids such as water or air circulated to remove heat from them should also suffice. I have also noted that the friction force delivered by a spinning tire bears a reasonable proportionality to the amount of force applied perpendicularly by the wheel to the pavement. Lifting a vehicle body or axle will result in decreasing the propulsive force (tractive effort) and lowering the body or axle will increase the tractive effort. Since most automobiles use springs between the axle and the body, the lifting and lowering of the body provides a very satisfactory method of adjusting the amount of tractive effort, without being overly sensitive to extraneous small disturbances. This is only one of several feasible methods of load adjustment. Another method is to use pressurized cooling fluid between the tire and the wear plate, increasing the wheel to plate clearance and decreasing the friction load as the fluid pressure increases. I have also observed that, in dynamic traction or drawbar dynamometer testing, on roadways or other test courses, the measurements of tractive effort, F, can be made to reasonable precision and reproducibility with several types of instrumentation, principally springs, straingages, and hydrostatic drawbar gages. Measurements of speed, S, are customarily made by an independent fifthwheel device in order to minimize inaccuracies introduced by such factors as variation in the rolling radius of vehicle tires. These points of careful workmanship also appear to have applicability to my invention, although some compromises may be made in favor of lower cost, when laboratory precision is not required. In my invention power P, can similarly be calculated from these measurements by the formula $P=KFS$, where K is a constant used to relate defined units to each other. It should be noted, however, that my invention provides these results while the vehicle remains in one place, without the need for expensive test roadways. These and other observations, thoughts, and calculations, including multitudinous details necessary to a good, low-cost dynamometer but generally within the state of the mechanical and electrical arts, have formed the background of this invention.

The working of this invention will become more apparent to those skilled in the art by reference to the following description of a preferred embodiment of this invention described with the aid of the accompanying drawings wherein.

Figure 1:
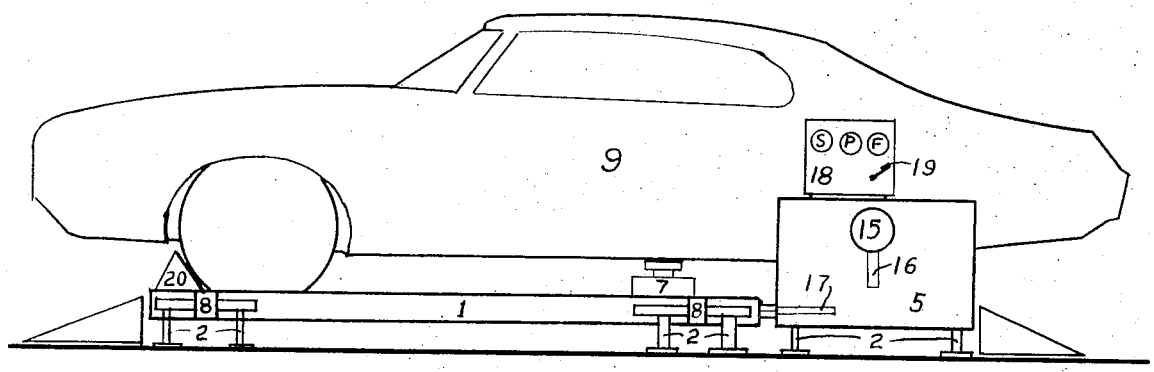
FIG. 1 is a generalized view of an automobile on the dynamometer.
Figure 2:
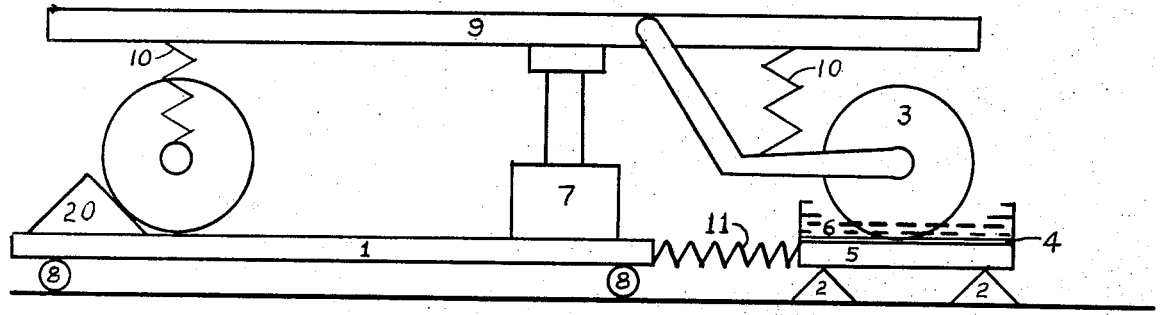
FIG. 2 is a schematic mechanical description of the relationships between an automobile and the dynamometer.
Figure 3:
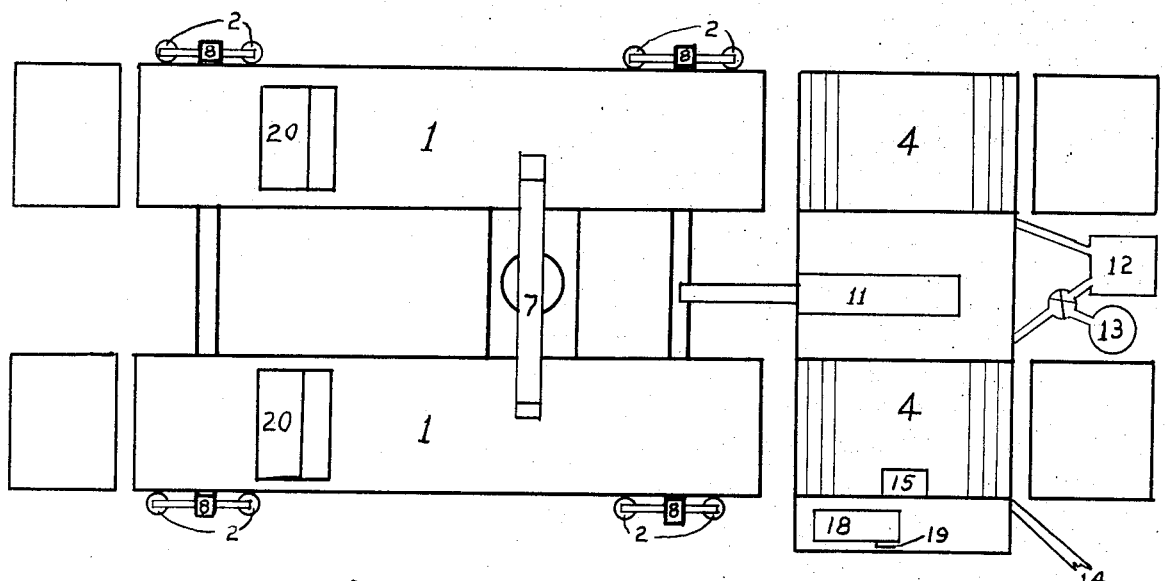
FIG. 3 is a general plan-view layout of the dynamometer.
Figure 4:
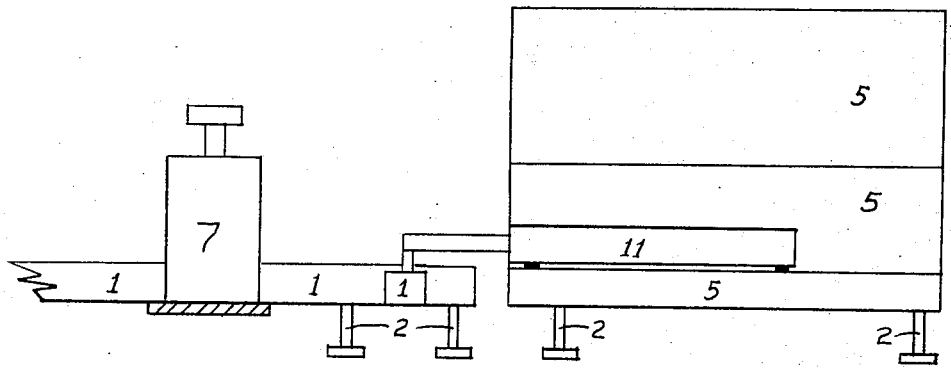
FIG. 4 is a horizontal cross-sectional view of the lifting and thrust-measuring members.
Figure 5:
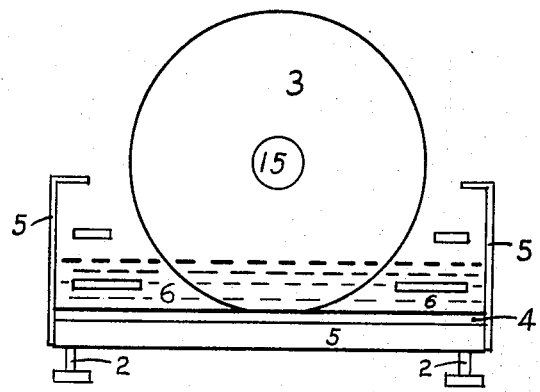
FIG. 5 is a horizontal cross-sectional view of a wheel and the proximate dynamometer members.
Figure 6:
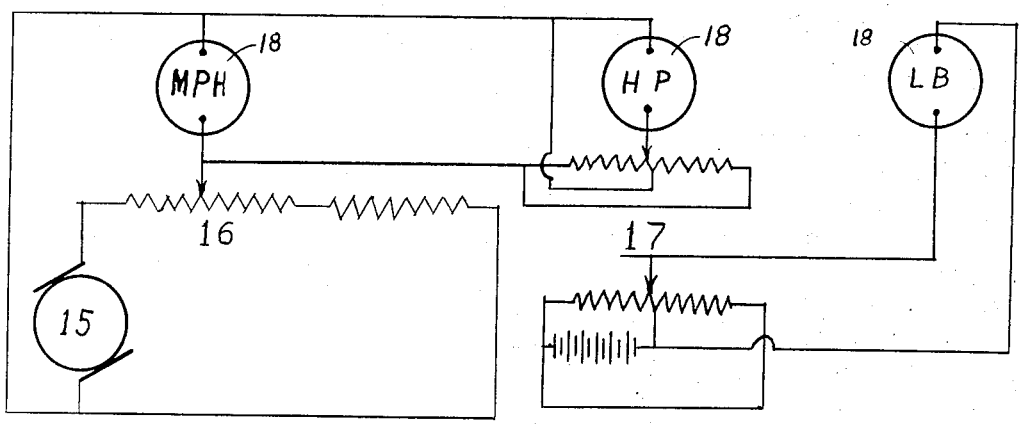
FIG. 6 is an electrical schematic of the measurement, computational and presentation instrumentation.

Referring now to the drawings wherein like elements are indicated by like numerals, numeral 1 refers to the main framework of the dynamometer, principally made of carbon steel, encompassing treadways on which the automobile wheels can roll and providing a rigid structure for installation and support of other members. This main framework, 1, is installed in a horizontally level position with the assistance of leveling jacks 2. The driving wheels, 3, of the automobile are located on wear plates, 4, which are made of corrosion-resistant steel and are easily reversible and replaceable to minimize the effects of wear. The power absorption structure, 5, to which the wear plates, 4, are mounted, provides splash shields, water retention troughs, and support for other components. It is leveled with jacks, 2, and is filled to a suitable level with water, 6. The lift system, 7, is adjustably mounted to the main framework, 1, which is free to roll on its low-friction mounting, 8, in the direction of vehicular travel. The lift system, 7, raises or lowers the body, 9, of the automobile. This causes the automobile springs, 10, to exert less or more force on the driving wheels, 3, which thereby exert less or more perpendicular force on the wear plates, 4. As the wheels, 3, rotate they provide a horizontal force by direct friction, and viscous shear through the water, against the wear plate. This horizontal force or tractive effort tends to move the automobile body, 9, horizontally in the direction of vehicle travel. This motion is transmitted to the main framework, 1, and its associated members. The thrust balance, 11, is a calibrated spring or other suitable optional force-measuring apparatus. It is connected between the main framework, 1, and the power absorption structure, 5, and both restrains and measures the force between these members. This force, except for a moderate amount of friction, is of a magnitude equal to the vehicular tractive effort. As the wheels, 3, slide against the wear plate, 4, heat is developed and is rapidly transferred to the water, 6. At the option of the user, the hot water can either be circulated through a cooling system, 12, or discarded to a drain, 13. A supply of fresh cool water, 14, is connected to make up the proper water level. An electrical tachometer generator, 15, is connected to the wheel, 3, and provides a voltage proportional to the rotational speed of the wheel, 3. The tachometer generator, 15, is mechanically mounted to an electrical linear potentiometer, 16, which is mounted to sense the actual rolling radius of the wheel, 3. The thrust balance, 11, also has its associated dual electrical linear potentiometer, 17, whose electrical resistances are connected so as to be directly proportional to the tractive effort, independent of the direction of that tractive effort. These electrical elements, along with other minor electrical elements not shown, are connected as shown in FIG. 6 to provide the generally-accepted measurement quantities. Tractive Effort (F) Power(P), and Speed(S). These measurement quantities are displayed in the customary units of Pounds (LB), Horsepower(HP), and Miles per Hour(MPH) on a readout panel, 18, which may be readily moved to accommodate the needs of the dynamometer operator. The lift system, 7, is electrically actuated, although optional pneumatic, hydraulic, and mechanical actuators are available. It is provided with a remote control, 19, mounted adjacent to the readout panel, 18. A strong safety guard, 20, is used to prevent motion of the body, 9, of the automobile with respect to the main framework, 1.

This preferred embodiment is arranged to accomodate automobiles with one driving axle, either rear-wheel or front-wheel drive. It can be loaded and unloaded from one end, as is customary in a smaller shop. With additions and rearrangement, vehicles may drive in from one end and drive out the other end in a throughflow traffic pattern. With simple modifications it is adaptable to vehicles with more than one driving axle.

In a general manner, while there has been disclosed an effective and efficient embodiment of the invention, it should be well understood that the invention is not limited to such embodiments, as there might be changes made in the arrangement, disposition, and form of the parts without departing from the principle of the present invention as comprehended within the scope of the accompanying claims.

I claim:

1. A testing device for wheeled automotive vehicles comprising:
   first support means;
   second support means in the form of an open topped liquid container mounted for horizontal sliding movement with respect to said first support means;
   resilient means connecting said first and second support means;
   means for sensing relative movement between said first and second support means.

2. The invention of claim 1 wherein:
   means are provided for sensing the speed of the driving wheels of a vehicle being tested, said driving wheels being placed on said second support means;
   means are provided for computing vehicular power from said speed sensing and said sensing of relative movement between said first and second support means.

3. The invention of claim 2 wherein means are provided for displaying the measured and computed values of testing results, such as speed, thrust, and power.

* * * * *